(12) United States Patent
Deming (10) Patent No.: US 7,301,540 B1
(45) Date of Patent: Nov. 27, 2007

(54) SYSTEM AND METHOD FOR RASTERIZATION THROUGH APPROXIMATION

(75) Inventor: James L. Deming, Madison, AL (US)

(73) Assignee: 3D Labs Inc., Ltd., Hamilton (BM)

( * ) Notice: Subject to any disclaimer, the term of this patent is extended or adjusted under 35 U.S.C. 154(b) by 628 days.

(21) Appl. No.: 10/634,379

(22) Filed: Aug. 5, 2003

(51) Int. Cl.
*G06T 11/20* (2006.01)

(52) U.S. Cl. .................. 345/441; 345/443

(58) Field of Classification Search ........... 345/471, 345/473, 441, 443
See application file for complete search history.

(56) References Cited

U.S. PATENT DOCUMENTS 5,528,737 A * 6/1996 Sfarti .................. 345/441
6,753,861 B2 * 6/2004 Thrasher et al. ........... 345/443
6,867,778 B2 * 3/2005 Tang et al. ............... 345/441

* cited by examiner

*Primary Examiner*—Kee M. Tung
*Assistant Examiner*—Dan Washburn (57) ABSTRACT

A system and method for rasterization an image on a display through approximation, wherein the image is decomposed into a plurality of convex polygons, each convex polygon being defined by a plurality of original edges and each original edge being defined by two vertices. The coordinates of original vertices of an original edge are truncated, and the truncated coordinates are used to generate modified coordinates that define a modified edge. A plurality of modified edges defines a potentially changing region. If a selected region of a display device intersects this potentially changing region defined by the modified edges, then the first selected region is refreshed on the display device.

21 Claims, 10 Drawing Sheets

SYSTEM AND METHOD FOR RASTERIZATION THROUGH APPROXIMATION

BACKGROUND OF THE INVENTION

1. Field of the Invention

The present invention generally relates to computer graphics. More specifically, the present invention relates to a method for rendering graphical images.

2. Description of the Related Art

Computers display the image of complex models by decomposing them in to polygons. Any convex polygon can be further divided into triangles. The process of converting a triangle in to a format useful for display is called rasterization. The rasterization process samples each triangle. Samples inside a triangle are assigned values determined by the characteristics of the triangle, and samples outside of the triangle are discarded. To achieve a high quality image, the sampling must be exact. Otherwise, an error in sampling may cause visual anomalies in the final image.

Figure 1:
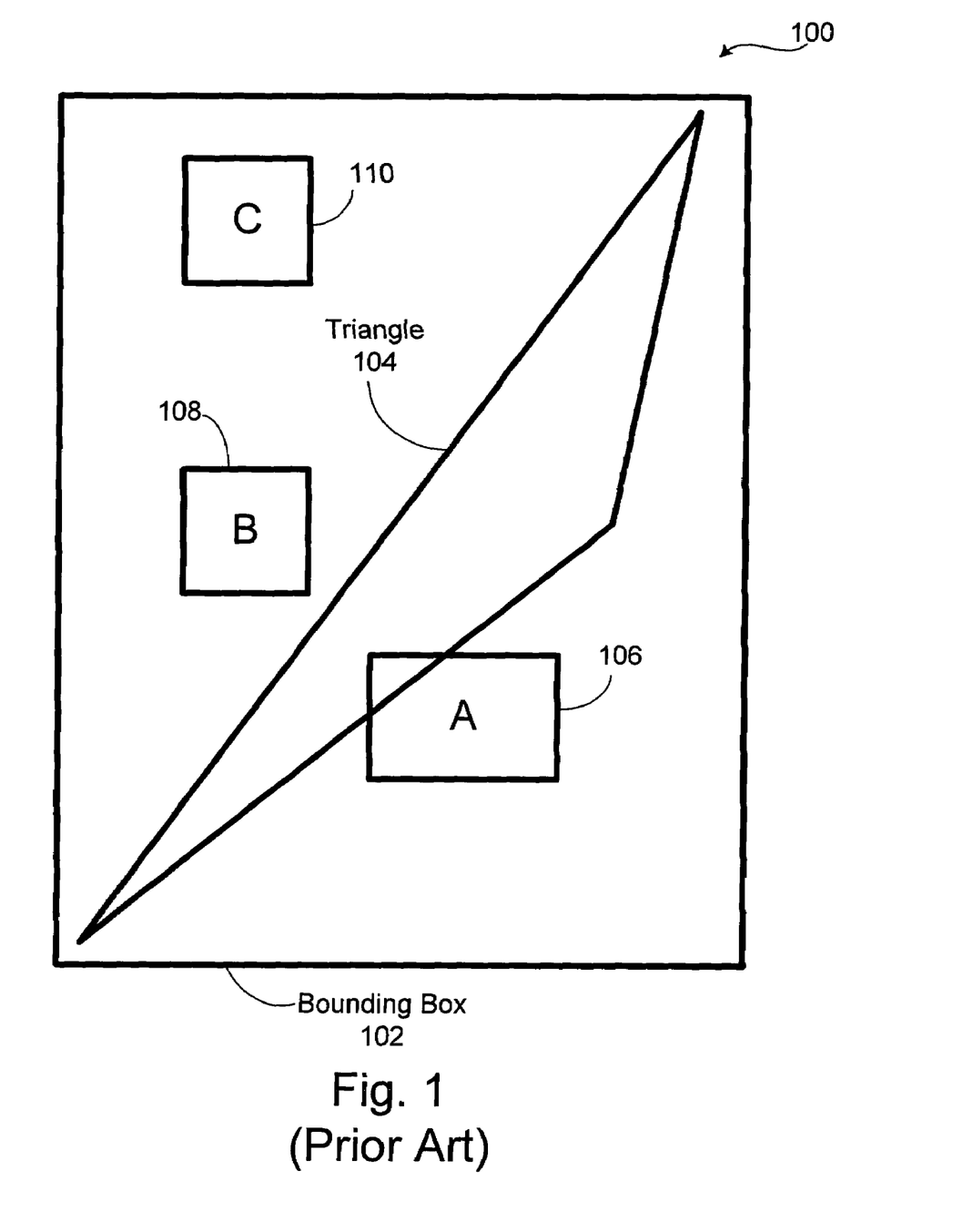
FIG. 1 illustrates a prior art bounding box approach.

The simplest method to detect the intersection of a triangle and a region is to create a bounding box around the triangle. If the bounding box touches the region of interest, then the triangle may intersect the region. Referring now to FIG. 1, where a prior art method of testing is illustrated using a bounding box 102 and a triangle 104. Three rectangular regions, A, B, and C, are tested whether they intersect with the triangle 104. First, the coordinates of the bounding box are determined by checking minimum and maximum values of x and y of the triangle 104.

poly_x_low=min(x0,x1, . . . xn)

poly_y_low=min(y0,y1, . . . yn)

poly_x_high=max(x0,x1, . . . xn)

poly_y_high=max(y0,y1, . . . y_n)

Then, the coordinates of the bounding box are compared with x and y value of a rectangular region, and the results of four comparison, true or false, are ANDed.

triangle_intersects_region=
  (poly_x_low<=region_x_high)&&

(poly_y_low<=region_y_high)&&

(poly_x_high>=region_x_low)&&

(poly_y_high>=region_y_low)

The intersection test is conservative and simple. However, a thin triangle with diagonal orientation may generate many false positives. The number of false positives is inversely proportional to the ratio of the triangle area to the bounding box area. Further, while the bounding box test alone is efficient, it is not very accurate. For rectangular regions A 106, B 108, and C 110, triangle_intersects_region would be TRUE for rectangular regions A 106, B 108, and C 110. However, for regions B 108 and C 110, the results would be false positives, and only region A 106 intersects the triangle 104.

To exactly determine if a triangle intersects a region, the appropriate corner of the region needs to be checked against each edge of the triangle. If every edge of the triangle has at least one corner of the region on the same side as the interior of the triangle, then the triangle and the region intersect. For example, in FIG. 2, corner 202 of region A 106 is in the same side as the interior 210 of the original triangle 104 for all three edges 204, 206, and 208 of the triangle 104. On the other hand, region B 108 does not have any corner that is in the same side as the interior 208 for all three edges 204, 206, and 208 of the triangle 104. Therefore, region B 108 does not intersect with the triangle 104.

To determine the intersection, a cross product must be computed for each edge. The sign of the cross product determines if that edge contains a corner of the region.

cp_n=(corner_x_n-x_0_n)*(y_1_n-y_0_n)-
  (corner_y_n-y_0_n)*(x_1_n-x_0_n)

where:

(corner_x_n, corner_y_n) is a corner of the region n.

(x_0_n, y_0_n) is one vertex of the nth edge (x_1_n, y_1_n) is the other vertex of the nth edge The precision of the math needed to compute the cross product is determined by the precision of the vertices and the granularity of the grid that determines the regions. A finer sampling grid, or higher vertex precision, will require more circuitry to compute the cross product. High vertex precision may require a large amount of circuitry. Consequently, the exact intersection test is accurate, but inefficient.

Figure 2:
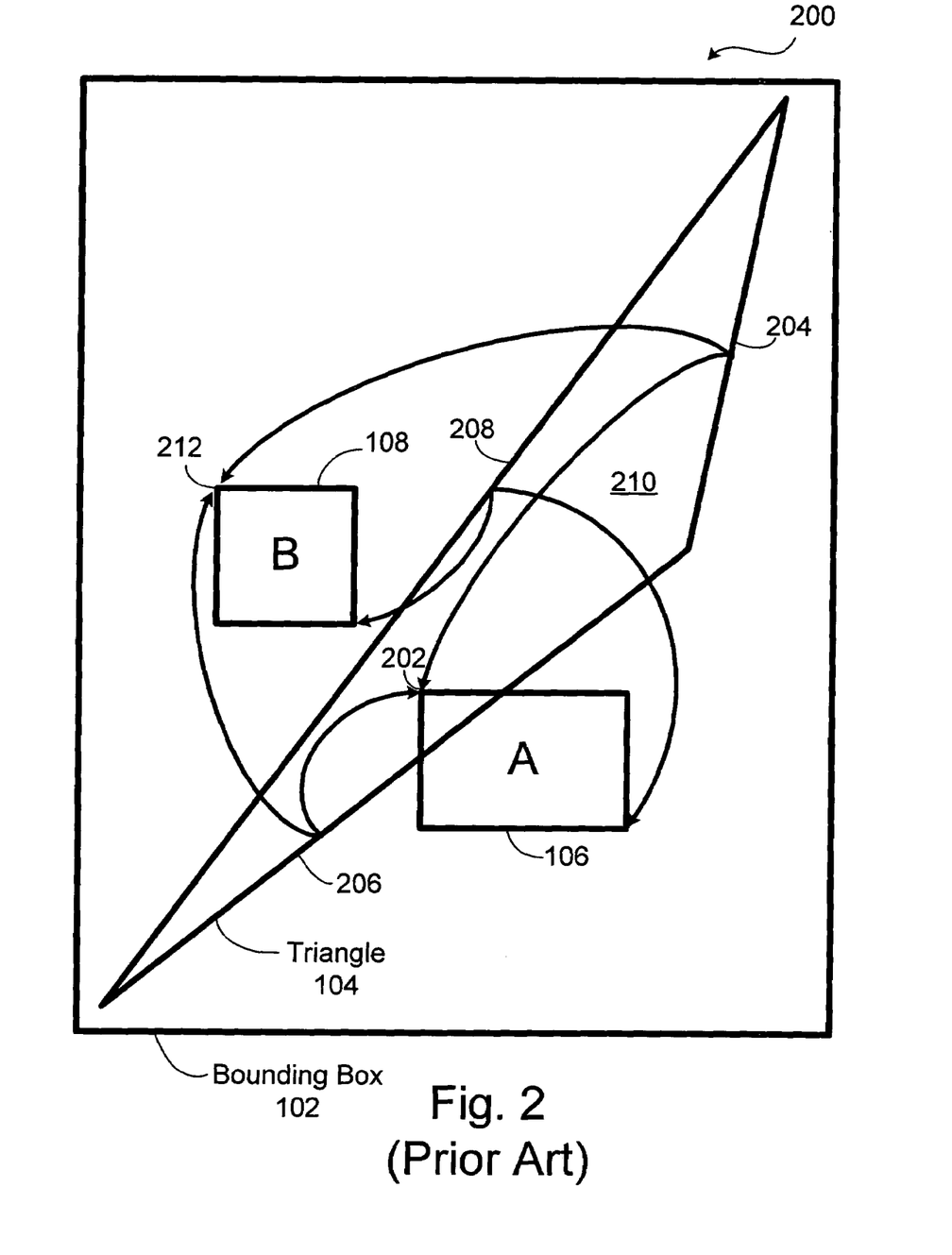
FIG. 2 illustrates a prior art approach for checking every edge of a triangle.

In the example of the prior art method used in FIG. 2, the top-left corner of region A 106 and region B 108 are on the interior side of the right edges 204 and 206 of the triangle 104. The bottom-right corner of region A 106 is on the interior side of the left edge 208 of the triangle 104, but the bottom-right corner of region B 108 is not. Therefore, the triangle 104 intersects region A 106, but not region B 108.

The cp_n calculation is intensive because it involves subtraction of two x coordinates and two y coordinates and multiplication of the results of these subtractions, where each coordinate is represented by an integer and a fraction. For example, for a system where each coordinate employs 15 bits to represent the integer part and 10 bits to represent the fraction part, the calculation of cp_n involves 25 bit subtractors and 25 bit multipliers, and the result would be a 50 bit number.

SUMMARY OF THE INVENTION

A better efficiency in determining the intersection of a triangle with a rectangular region during a rasterization process can be achieved with the system and method of the present invention. In one aspect, the invention is a method for rasterizing an image on a display that is divided into a plurality of selected regions, wherein the image is decomposed into one or more convex polygons, each convex polygon defined a plurality of original edges, wherein each original edge is defined by a first vertex and a second vertex. The method is comprised of the steps of truncating coordinates of the first vertex to a preselected precision, the truncated coordinates of the first vertex defining a first truncated vertex, truncating coordinates of the second vertex to the preselected precision, the truncated coordinates of the second vertex defining a second truncated vertex, generating coordinates for a first modified vertex by adjusting the first truncated vertex according to characteristics of the original edge, generating coordinates for a second modified vertex by adjusting the second truncated vertex according to the characteristics of the original edge, wherein the first modified vertex and the second modified vertex defining a modified edge for each original edge, and, if a first selected region intersects a second region defined by the modified edges, then refreshing the selected region on the display.

The truncation of coordinates may be done by eliminating the fractional part of the coordinates and the generation of coordinates for a modified vertex further comprising the steps of, if the original edge touches a top vertex of the convex polygon, then assigning a true condition to a first element, otherwise assigning a false condition to the first element; if the original edge is on left of the interior of the convex polygon, then assigning a true condition to a second element, otherwise assigning a false condition to the second element; if the original edge has a negative slope, then assigning a true condition to a third element, otherwise assigning a false condition to the third element; if the first truncated vertex and the second truncated vertex defines an edge parallel to an x-axis, then assigning a true condition to a fourth element, otherwise assigning a false condition to the fourth element; if the first truncated vertex and the second truncated vertex defines an edge parallel to a y-axis, then assigning a true condition to a fifth element, otherwise assigning a false condition to the fifth element; deriving a first pair values based on the first element, the second element, the third element, the fourth element, and the fifth element; and adding the first pair values to the truncated coordinates of the first vertex.

In other aspect, the invention is a table for deriving adjustment values for coordinates of truncated vertices, the table being used in rasterizing computer graphics. The table comprises a plurality of entries, wherein each entry having a top vertex indicator, a left region indicator, a negative slope indicator, a x-axis parallel indicator, a y-axis parallel indicator, a top pair adjustment values, and a bottom pair adjustment values.

In yet another aspect, the invention is a computer readable medium on which is stored a computer program that rasterizes an image on a display that is divided into a plurality of selected regions, wherein the image is decomposed into one or more convex polygons, each convex polygon being defined by a plurality of original edges, wherein each original edge is defined by a first vertex and a second vertex. The computer program is comprised of instructions, which when executed by a computing device performs the steps of truncating coordinates of the first vertex to a preselected precision, the truncated coordinates of the first vertex defining a first truncated vertex, truncating coordinates of the second vertex to the preselected precision, the truncated coordinates of the second vertex defining a second truncated vertex, generating coordinates for a first modified vertex by adjusting the first truncated vertex according to characteristics of the original edge, generating coordinates for a second modified vertex by adjusting the second truncated vertex according to the characteristics of the original edge, wherein the first modified vertex and the second modified vertex defining a modified edge for each original edge, and, if a first selected region intersects a second region defined by the modified edges, then refreshing the first selected region on the display.

Other objects, advantages, and features of the present invention will become apparent after review of the hereinafter set forth in Brief Description of the Drawings, Detailed Description of the Invention, and the Claims.

DETAILED DESCRIPTION OF THE INVENTION

In this description, like numerals refer to like elements throughout the several views. The invention introduces an approximate rasterization process that eliminates needs for complex calculation circuitries. The rasterization may be complicated and time consuming. To increase performance, triangles can be sorted by the approximate rasterization process of the present invention as is further described herein. The approximate rasterization sorts the triangles based on which rectangular regions of the display they intersect. The results of the approximate rasterization process are used later by the exact detailed rasterization.

The approximate rasterization should be efficient and accurate. It need not be exact, as long as the results are conservative. False positives are allowed, but not false negatives. A false positive is when the result indicates an intersection while in reality there is no intersection. A false negative is when the result indicates no intersection while in reality there is an intersection.

False negatives will cause triangles to be dropped from regions they intersect, producing visible anomalies. False positives generate extra work for the detailed rasterization process, reducing the overall performance. However, false positives do not affect image quality. Increasing the accuracy of the approximate rasterization reduces the rate of false positives at the expense of more circuitry.

A significant circuitry savings can be achieved by approximating the edges of the triangle. To achieve the savings in circuit area, the vertices of the new edges must have fewer significant bits than the original vertices. The edges are approximated by moving the vertices that define them. A vertex at coordinates (xxx.zzz, yyy.qqq), where xxx are the integer part of the x coordinate, zzz are the fraction part of the x coordinate, yyy are the integer part of the y coordinate, and qqq are the fraction part of the y coordinate, is approximated by moving it to a selected position where zzz and qqq have predefined values. The values for zzz and qqq are adjusted according to a method explained below.

The edge approximation results in a small increase in the number of false positives. The new edges formed by moving the vertices must not intersect the original triangle. If the new edges do intersect the original triangle, the intersection test may produce false negatives.

The first step in approximating the triangle is to determine the relationship of each of the original edges with respect to the interior of the triangle. An edge can touch the top vertex of the original triangle. An edge can be to the left or right of the interior. The sign of the slope of the edge can be positive or negative. A left edge with a negative slope will be above the interior, as will a right edge with a positive slope. Left edges with positive slopes and right edges with negative slopes are below the interior.

The next step in the approximation is to truncate coordinates of the vertices to the desired precision. If a coordinate is represented by 15 fractional bits, the coordinate can be truncated to have only 5 fractional bits or 0 fractional bits. Truncation moves the vertices and edges up and to the left of the original triangle. The edges produced by truncation may intersect the original triangle. The edges must be modified to prevent intersection with the original triangle.

The vertices for the modified edges are generated based on the original edge relationships, and the truncated vertices. The modified edges are created by adjusting the truncated vertices away from the interior of the triangle. The amount of adjustment must be large enough that the resulting edges do not intersect the interior of the polygon, but should be kept small to reduce the number of false positives.

The process of generating new vertices is determined by the Table 1.

TABLE 1

| Top Vertex | Left | Slope < 0 | Small X | Small Y | Top | Bottom |
|---|---|---|---|---|---|---|
| 1 | 1 | 0 | 0 | X | (0,1) | (−1,2) |
| 1 | 1 | 0 | 1 | X | (0,1) | (0,2) |
| 1 | 1 | 1 | X | 0 | (0,0) | (−1,−1) |
| 1 | 1 | 1 | X | 1 | (0,0) | (−1,0) |
| 1 | 0 | 0 | X | 0 | (1,0) | (2,−1) |
| 1 | 0 | 0 | X | 1 | (1,0) | (2,0) |
| 1 | 0 | 1 | 0 | X | (1,1) | (2,2) |
| 1 | 0 | 1 | 1 | X | (1,1) | (1,2) |
| 0 | 1 | 0 | X | 0 | (−1,2) | (0,1) |
| 0 | 1 | 0 | X | 1 | (−1,1) | (0,1) |
| 0 | 1 | 1 | 0 | X | (−1,−1) | (0,0) |
| 0 | 1 | 1 | 1 | X | (0,−1) | (0,0) |
| 0 | 0 | 0 | 0 | X | (2,−1) | (1,0) |
| 0 | 0 | 0 | 1 | X | (1,−1) | (1,0) |
| 0 | 0 | 1 | X | 0 | (2,2) | (1,1) |
| 0 | 0 | 1 | X | 1 | (2,1) | (1,1) |

Where:
Top Vertex indicates an edge that touched the original top vertex of the triangle.
Left indicates an edge to the left of the interior.
Slope < 0 indicates an edge a negative slope.
Small X indicates an edge whose truncated X vertices are equal.
Small Y indicates an edge whose truncated Y vertices are equal.
Top is the amount to add to the top-most truncated vertex of the edge.
Bottom is the amount to add to the bottom-most truncated vertex of the edge.
Entry with "X" means "ignore" condition.
Entry with "1" means "true" condition.
Entry with "0" means "false" condition.
The origin is assumed to be at the top-left corner.

Table 1 shows the adjustments necessary if the vertices are truncated to an integer. Integer truncation produces an efficient and accurate circuit. However, accuracy and circuit area can be traded off by selecting different truncation points. The adjustments from the table are scaled by the precision of the truncated vertices. For example, if the vertices are truncated to one half, then the adjustments are scaled by one half.

Figure 3:
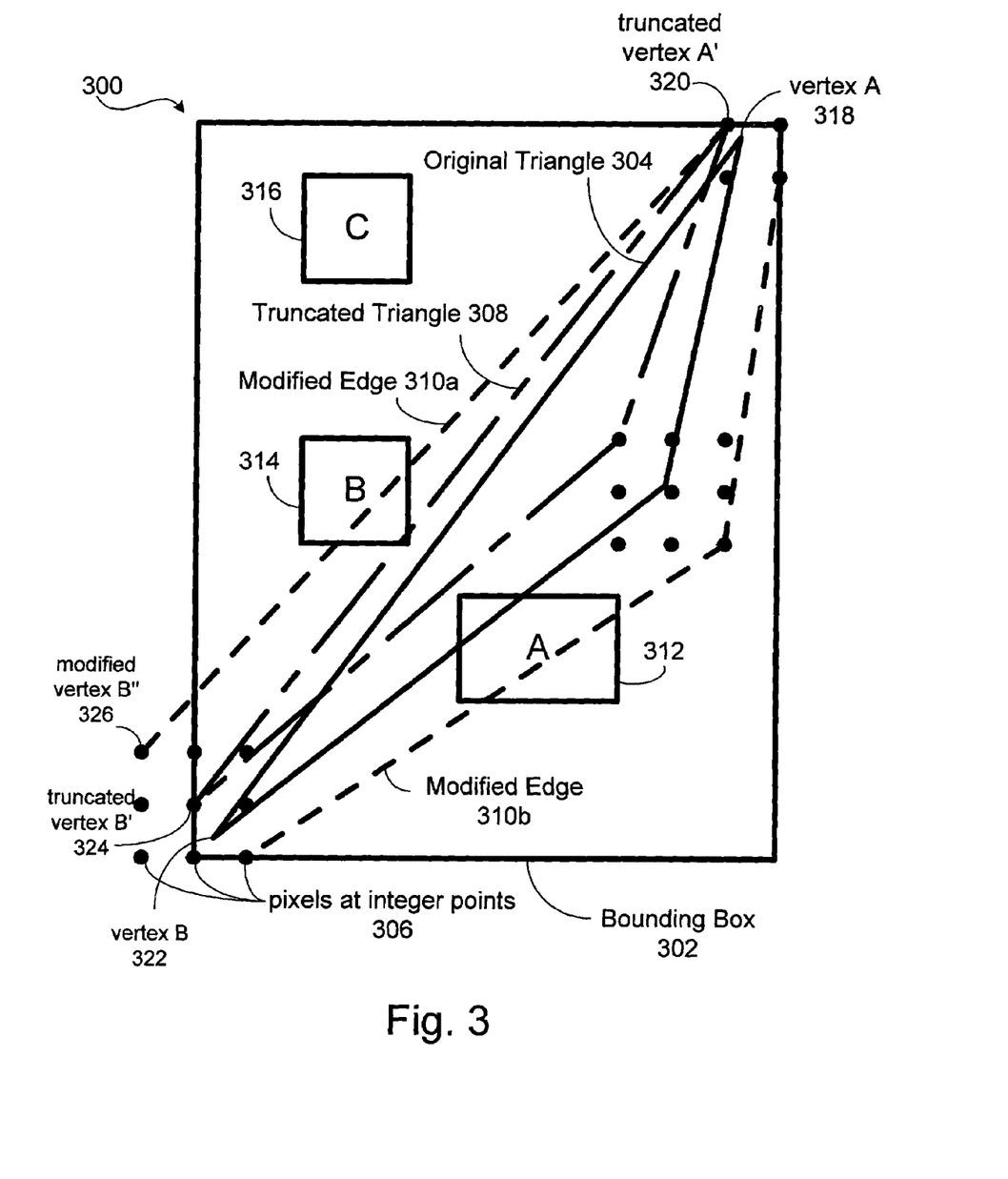
FIG. 3 illustrates an approximation approach of the present invention.

FIG. 3 illustrates an approximation process 300. The original triangle 304 has three vertices and each vertex has many significant fractional bits. The original triangle 304 is enclosed by a bounding box 302. The dots represent pixels at integer points 306, i.e., pixels whose coordinates have fractional part equal to zero. The truncation process moves three vertices toward three nearest integer pixel points and forming a truncated triangle 308. The vertices of the truncated triangle 308 have no significant fractional bits.

To determine modified edge 310a, Table 1 is used. Vertex A 318 is moved to truncated vertex A' 320 and vertex B 322 is moved to truncated vertex B' 324 through the truncation process. The edge A'B' touches the top vertex and in on the left of the interior of the triangle, so the "Top Vertex" column equals to 1 and "Left" column also equals to 1. The edge A'B' has a negative slope, since the origin of coordinates is on the top left corner and (B'y−A'y)/(B'x−A'x)<0. Hence, "Slope<0" is true and equals to 1. After determining "Top Vertex," "Left," and "Slope<0," it is needed to determine the condition for "Small Y." "Small X" is a "don't care" condition for this particular case. "Small Y" is true (1) if the truncated vertices A' and B' have the same y coordinate, which means the edge A'B' is parallel to x-axis. In this case, "Small Y" is not true. So the entry selected is $3^{rd}$ one, where "Top" equals (0, 0) and "Bottom" equals (−1, −1). The values indicated by "Top" are added to the coordinates of the top vertex, in this case, the truncated top vertex A' 320, and the values indicated by "Bottom" are added to the coordinates of the bottom vertex, in this case, the truncated vertex B' 324. The result of adding (0, 0) to vertex A' 320 and adding (−1, −1) to vertex B' 324 is a modified vertex A" that is identical to truncated vertex A' 320 and a modified vertex B" 326 respectively. An edge connecting these two vertices is a modified edge 310a. Repeating the above process leads to a modified edge 310b.

Region A 312 intersects the original triangle 304. If the truncated triangle 308 were used to test for intersection, a false negative would be returned for region A 312. Using a region defined by the modified the edges, region A 312 will return true for the intersection test. Region B 314 also intersects the region defined by the modified edge 310a, but it does not intersect the original triangle 304. Region B 314 will return a false positive. Region C 316 does not intersect the original triangle 304 or the region defined by the modified edges, but it does intersect the bounding box 302. Region C 316 will return a false positive if only the bounding box 302 was used to test for intersection, but it returns a negative when the modified edges are used.

Truncating the vertices of the original triangle will generate a triangle that may intersect the original triangle. Any region that touches the area outside the truncated triangle, and inside the original triangle, will produce a false negative for the intersection test. The modified edges define a potentially changing region that must completely enclose the original triangle. The amount of adjustment for the vertices is arbitrary, as long as the following considerations are kept in mind.

The new edges should be kept as close to the original triangle as possible. The larger the area between the original edges and the modified edges, the more false positives will occur. Retaining more significant bits will increase the circuitry required to compute the cross products. Decreasing the number of significant bits will increase the number of false positives.

The sign of the slope of the modified edge must be the same as the corresponding original edge. If the modified edge and the original edge have opposite signs, the region defined by the modified edges might not be convex.

The slope of a left edge that touches the top vertex must not be less than the slope of its modified edge. The slope of a right edge that touches the top vertex must not be greater than the slope of its modified edge. The slope of a left edge that touches the bottom vertex must not be greater than the slope of its modified edge. The slope of a right edge that touches the bottom vertex must not be less than the slope of its modified edge. Violating these conditions can produce a concave region.

The above technique works well with triangles. It may also be applied to convex polygons, and in particular to convex quads. Every edge of the quad must touch either the top-most vertex, or the bottom-most vertex. Arbitrary rotations of rectangles and parallelograms meet this condition.

Figure 4:
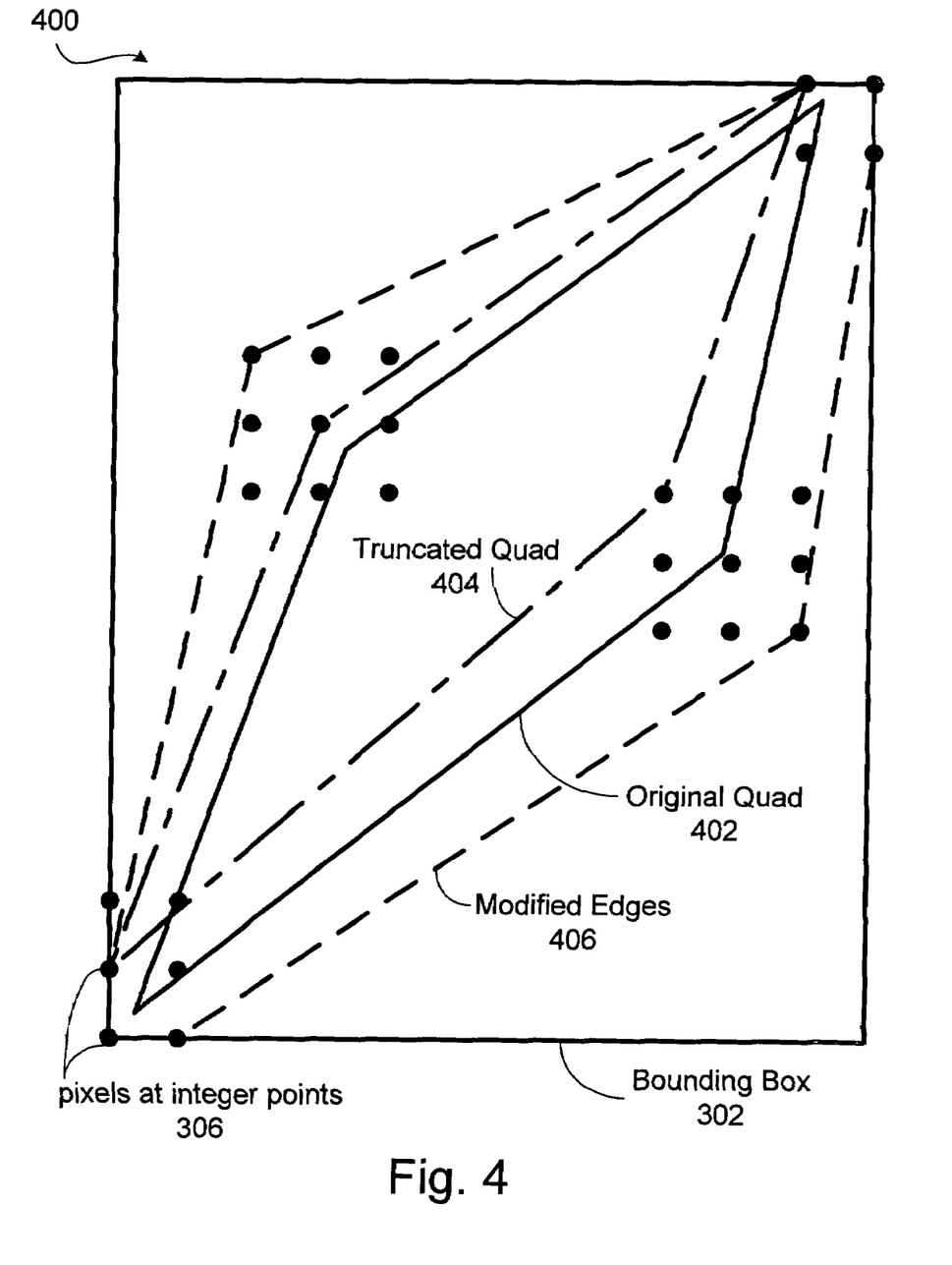
FIG. 4 illustrates an approximation approach for a convex quad.

FIG. 4 illustrates an approximation approach for a convex quad 400. Every edge touches either the top-most or bottom-most vertex. Each vertex of the original quad 402 is truncated and a truncated quad 404 is derived. Each edge of the truncated quad 404 is mapped into an entry in Table 1, and two pair of adjustment values are retrieved from the entry and added to both vertices of the edge. Finally, modified edges 406 are derived from the modified vertices.

The worst-case scenario for the vertex modifications is when two edges on the same side, with the same slope sign, are connected. To prevent intersection, and to keep the edges convex, one modified edge must have a slope smaller than its original edge, and one modified edge must have a slope larger than its original edge.

All triangles have one edge that connects to the top and bottom vertices, this edge does not meet the worst-case scenario. For many triangles, the edges that connect at the middle vertex have opposite slope signs. By checking the edge flags (slope signs), the modification logic can detect if an edge connects to another edge on the same side, with the same slope sign. If the edge meets the worst-case scenario, then one vertex must be adjusted more than the other vertex. Otherwise, the same adjustment can be applied to both vertices, as long as both modified vertices are not equal. This can decrease the number of false positives by a small amount.

Figure 5:
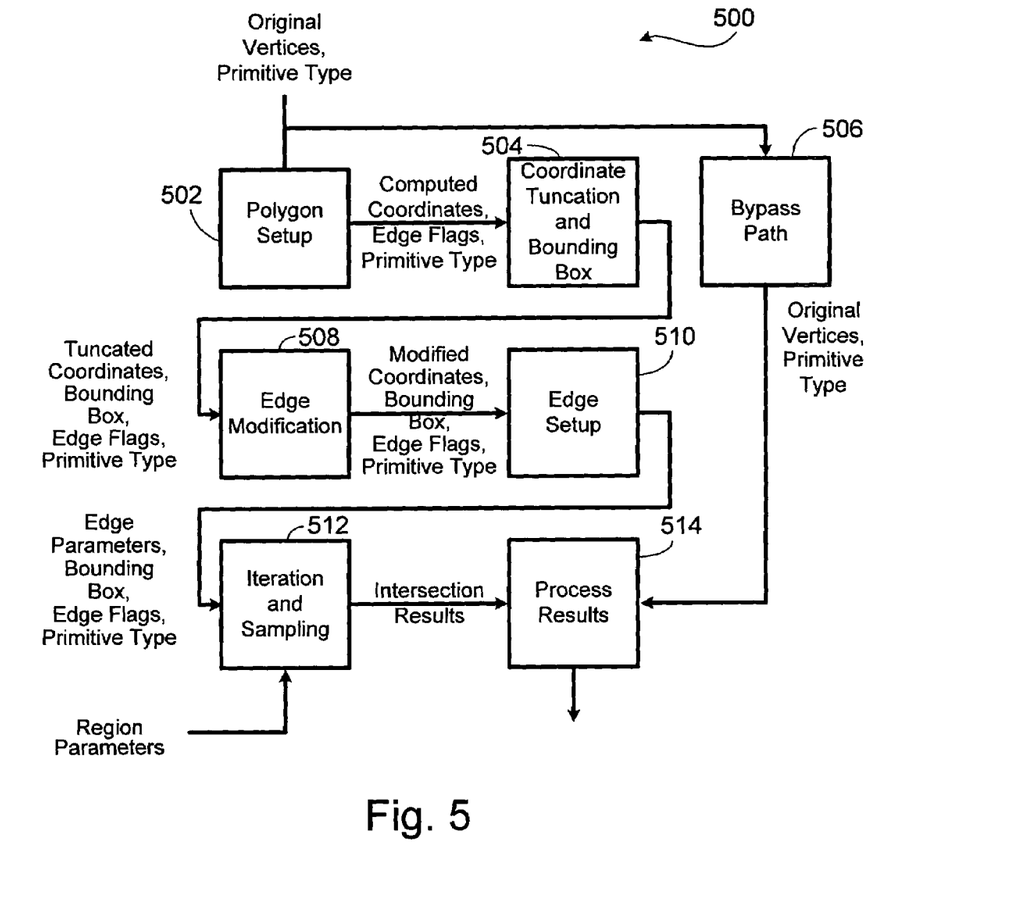
FIG. 5 is a flow chart for an approximation process.

FIG. 5 is a flow chart 500 for an approximation process for triangles or quads. The system receives the vertices of an object that needs rendering, and the type of processing to perform. This information may come from a variety of sources.

The Polygon Setup process, step 502, uses the original vertices and primitive type to compute the coordinates of the triangles or quads that need to be rendered. The Polygon Setup process, step 502, also determines the sign of the slope for each edge, and the sign of the slope of the edges. It also determines the top and bottom vertices, and which edges connect at those vertices. For each edge, the Polygon Setup process determines on which side of the interior the edge lies. All this information is sent in the Edge Flags. The original vertices and primitive type are also sent to the Bypass Path, step 506, for use later.

Coordinate Truncation and Bounding Box, step 504, simply truncates the coordinates to the desired precision. It also creates the bounding box that encloses the original primitive. The bounding box has the same precision as the truncated coordinates. These values, along with the edge flags and primitive type, are passed to the next stage.

Edge Modification, step 508, takes the truncated coordinates and computes the coordinates of the modified edges. The modified edges coordinates, along with the bounding box, edge flags, and primitive type, are passed to the Edge Setup stage, step 510. Edge Setup, step 510, uses the modified edge coordinates to compute the parameters needed to iterate and sample the edges. The edge parameters, along with the bounding box, edge flags, and primitive type, are passed to the Iteration and Sampling stage, step 512. Iteration and Sampling, step 512, determines the region intersections. It receives parameters from the Edge Setup, step 510. It also receives the parameters that define the regions. The stage iterates through the list or array of regions to test. If any point inside a region is also inside the modified edges, and the bounding box, then that region is flagged as intersecting.

The results of all the intersection tests are passed to the Process Results stage, step 514. It matches the intersection results with the original vertices and primitive type from the Bypass Path, step 506. At this point, any algorithms that rely on the inexact, but conservative, rasterization may be applied.

The following derivations show how the table of adjustments (Table 1) was computed. The derivations assume that X increases to the right, and Y increases downward. The truncations are to integers. All edges are assumed to connect to the middle vertex and have the same slope sign as the other edge connected to the middle vertex. Therefore, the worst-case scenario is assumed.

Truncating X moves an edge to the left of the original edge. Adding one to the truncated X moves an edge to the right of the original edge. If the edge is on the left side of the triangle, truncating X moves the edge away from the interior. If the edge is on the right side of the triangle, truncating X and adding one moves the edge away from the interior.

Truncating Y moves an edge up from the original edge. Adding one to the truncated Y moves an edge down from the original edge. If the edge is above the interior of the triangle, truncating Y moves the edge away from the interior. If the edge is below the interior of the triangle, truncating Y and adding one moves the edge away from the interior. An edge is above the interior if it is on the left and the slope is negative, or it is on the right and the slope is positive. An edge is below the interior if it is on the left and the slope is positive, or it is on the right and the slope is negative.

If two edges on the left side of the interior have the same slope, then the slope of the edge touching the top must be greater than the slope of the edge touching the bottom. If two edges on the right side of the interior have the same slope, then the slope of the edge touching the top must be less than the slope of the edge touching the bottom.

Given an edge N with a top and a bottom vertices at (XNt,YNt) and (XNb,YNb) respectively, where YNt<=YNb.

The corresponding modified edge M has vertices at
(trunc(XNt)+XNAt, trunc(YNt)+YNAt) and
(trunc(XNb)+XNAb, trunc(YNb)+YNAb).

The slope of N is (YNb−YNt)/(XNb−XNt), and the slope of M is ((trunc(YNb)+YNAb)−(trunc(YNt)−YNAt))/((trunc(XNb)+XNAb)−(trunc(XNt)+XNAt)).

The function trunc(x) returns x truncated to the desired precision. The truncation function returns a value such that: 0<=x−trunc(x)<1. The fraction function is defined as: frac(x)=x−trunc(x). Substituting frac(x) for x−trunc(x) yields: 0<=frac(x)<1. If trunc(x1)==trunc(x0), the frac(x1)−frac(x0)=x1−x0. In all cases: −1<=+/−(frac(x1)−frac(x0))<=1.

The following is a description of calculation for top left edges. Assume that edge N and edge NN are left edges with negative slopes, edge N touches the top vertex, and edge NN touches the bottom vertex. Both edges are above and to the left of the interior. The following conditions must be maintained to prevent M and MM, modified edges, from intersecting N or NN:

1. XNt>=trunc(XNt)+XNAt
2. YNt>=trunc(YNt)+YNAt
3. XNNb>=trunc(XNNb)+XNNAb
4. YNNb>=trunc(YNNb)+YNNAb
5. 0>=slope(M)>=slope(N)>slope(NN)>=slope(MM)

The smallest adjustments that satisfy conditions 1 through 4 are:

```
XNAt = 0, YNAt = 0, XNNAb = 0, YNNAb = 0
slope(N) = (YNb-YNt)/(XNb-XNt)
slope(M) =
    ((trunc(YNb)+YNAb)-(trunc(YNt)+0))/
    ((trunc(XNb)+XNAb)-(trunc(XNt)+0))
if numerator(slope(N)) >= numerator(slope(M)) >= 0
and denominator (slope(M)) <= denominator(slope(N)) <= 0
then slope(M) >= slope(N)
YNb-YNt = YNAb+trunc(YNb)-trunc(YNt) >= 0
XNAb+trunc(XNb)-trunc(XNt) <= XNb-XNt <= 0
YNb-YNt-(trunc(YNb)-trunc(YNt))>=YNAb>=-(trunc(YNb)-
     trunc(YNt))
XNAb<=XNb-XNt-(trunc(XNb)-trunc(XNt))<=-(trunc(XNb)-
     trunc(XNt))
frac(YNb)-frac(YNt)>=YNAb>=-(trunc(YNb)-trunc(YNt))
XNAb<=frac(XNb)-frac(XNt)<=-(trunc(XNb)-trunc(XNt))
    -1 <= frac(XNb)-frac(XNt) <= 1
therefore:  XNAb <= -1
if trunc(YNb)==trunc(YNt)
then frac(YNb)-frac(YNt) >= YNAb >= 0
    0 >= frac(YNb)-frac(YNt) >= 1
therefore:   YNAb = 0 when trunc(YNb)==trunc(YNt)
if trunc(YNb)!=trunc(YNt)
then frac(YNb)-frac(YNt)>=YNAb>=-(trunc(YNb)-trunc(YNt))
    frac(YNb) - frac(YNt) >= YNAb
    1 >= frac(YNb) - frac(YNt) >= -1
therefore:  YNAb <= -1 when trunc(YNb)!=trunc(YNt)
slope(NN) = (YNNb-YNNt)/(XNNb-XNNt)
slope(MM) =
    ((trunc(YNNb)+0)-(trunc(YNNt)+YNNAt))/
    ((trunc(XNNb)+0)-(trunc(XNNt)+XNNAt))
if numerator(slope(MM)) >= numerator(slope(NN)) >= 0
and denominator (slope(NN)) <= denominator(slope(MM)) <= 0
then slope(NN) >= slope(MM)
-YNNAt+trunc(YNNb)-trunc(YNNt) >= YNNb-YNNt >= 0
XNNb-XNNt <= -XNNAt+trunc(XNNb)-trunc(XNNt) <= 0
YNNAt<=-YNNb+YNNt+trunc(YNNb)-trunc(YNNt)
XNNt-XNNb+trunc(XNNb)-trunc(XNNt)>=
    XNNAt>=trunc(XNNb)-trunc(XNNt)
YNNAt<=frac(YNNt)-frac(YNNb)
frac(XNNt)-frac(XNNb)>=XNNAt>=trunc(XNNb)-trunc(XNNt)
    -1 <= frac(YNNt)-frac(YNNb) <= 1
therefore:  YNNAt <= -1
if trunc(XNNb)==trunc(XNNt)
then frac(XNNt)-frac(XNNb)>=XNNAt>= 0
    0 >= XNNb-XNNt >= 1
therefore:  XNNAt = 0 when trunc(XNNb)==trunc(XNNt)
if trunc(XNNb)!=trunc(XNNt)
then frac(XNNt)-frac(XNNb)>=XNNAt>=trunc(XNNb)-trunc(XNNt)
    1 >= frac(XNNt) - frac(XNNb) >= -1
therefore:  XNNAt <= -1 when trunc(XNNb)!=trunc(XNNt)
```

Figure 6:
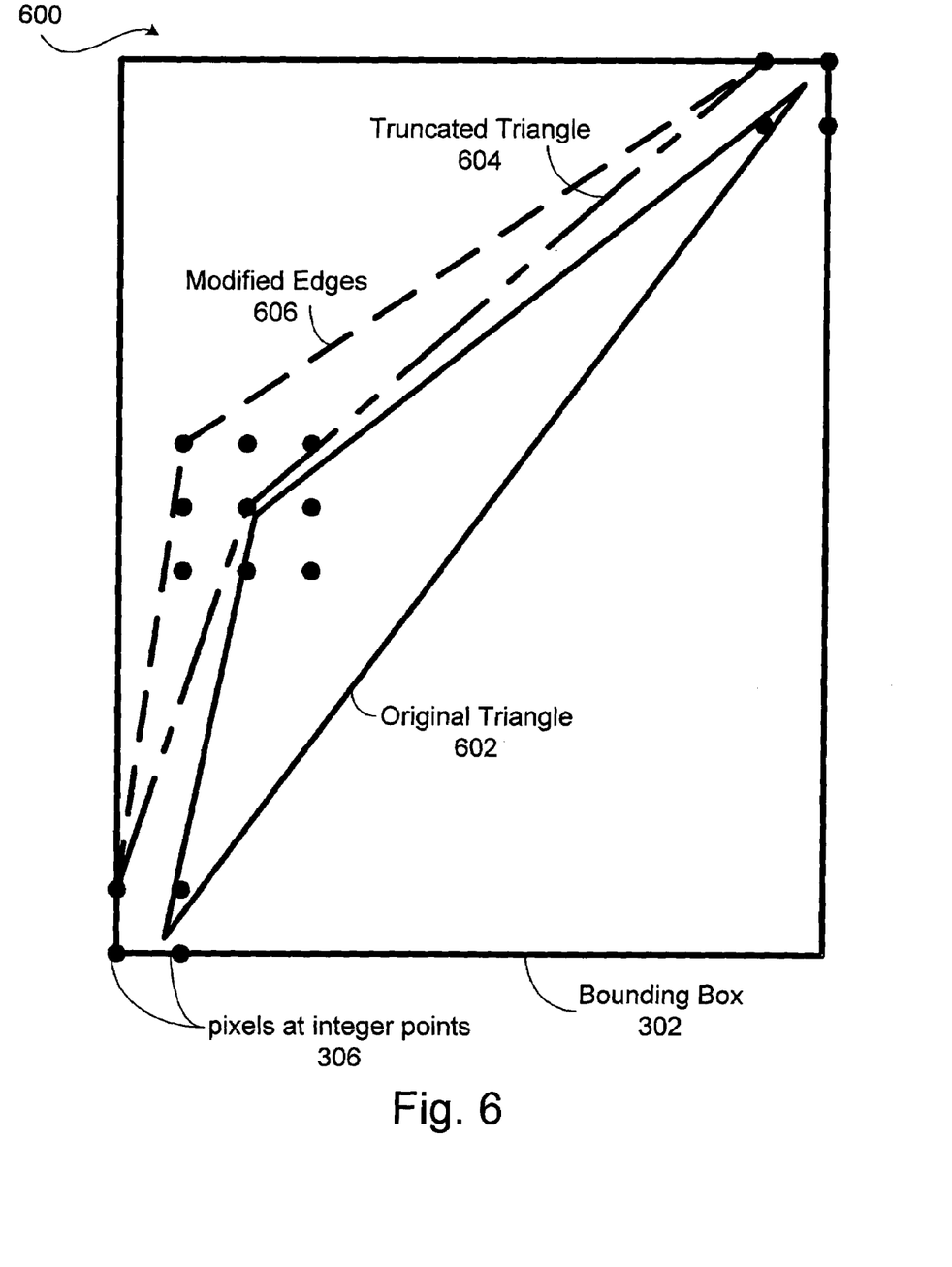
FIG. 6 illustrates a truncation process for top left edges.

FIG. 6 illustrates an example of a truncation process 600 for top left edges. The two shorter edges of the triangle 602 are both top-left edges. It is also shown that there are two shorter edges after the truncation. The long edge of the original triangle 602 is bottom-right edge. The truncation and modification of this edge is not shown in FIG. 6.

The following is a description of calculations for bottom left edges. Assume that edge N and edge NN are left edges with positive slopes, edge N touches the top vertex, and edge NN touches the bottom vertex. Both edges are below and to the left of the interior. The following conditions must be maintained to prevent M and MM from intersecting N or NN:

6. XNt>=trunc(XNt)+XNAt
7. YNt<=trunc(YNt)+YNAt
8. XNNb>=trunc(XNNb)+XNNAb
9. YNNb<=trunc(YNNb)+YNNAb
10. slope(M)>=slope(N)>slope(NN)>=slope(MM)>=0

The smallest adjustments that satisfy conditions 6 through 10 are:

```
XNAt = 0, YNAt = 1, XNNAb = 0, YNNAb = 1
slope(N) = (YNb-YNt)/(XNb-XNt)
slope(M) =
    ((trunc(YNb)+YNAb)-(trunc(YNt)+1))/
    ((trunc(XNb)+XNAb)-(trunc(XNt)+0))
if numerator(slope(M)) = numerator(slope(N)) >= 0
and denominator(slope(N)) >= denominator(slope(M)) >= 0
then slope(M) >= slope(N)
YNAb-1+trunc(YNb)-trunc(YNt) >= YNb-YNt >= 0
XNb-XNt >= XNAb+trunc(XNb)-trunc(XNt) >= 0
YNAb-1>=frac(YNb)-frac(YNt)
frac(XNb)-frac(XNt) >= XNAb >= -(trunc(XNb)-trunc(XNt))
    -1 <= frac(YNb)-frac(YNt) <= 1
therefore:   YNAb >= 2
if trunc(XNb)==trunc(XNt)
then frac(XNb)-frac(XNt) >= XNAb >= 0
    0 >= frac(XNb)-frac(XNt) >= 1
therefore:   XNAb = 0 when trunc(XNb)==trunc(XNt)
if trunc(XNb)!=trunc(XNt)
then frac(XNb)-frac(XNt)>=XNAb>=-(trunc(XNb)-trunc(XNt))
    1 >= frac(XNb) - frac(XNt) >= -1
therefore:   XNAb <= -1 when trunc(XNb)!=trunc(XNt)
slope(NN) = (YNNb-YNNt)/(XNNb-XNNt)
slope(MM) =
    ((trunc(YNNb)+1)-(trunc(YNNt)+YNNAt))/
    ((trunc(XNNb)+0)-(trunc(XNNt)+XNNAt))
if numerator(slope(NN)) >= numerator(slope(MM)) >= 0
and denominator (slope(MM)) >= denominator(slope(NN)) >= 0
then slope(NN) >= slope(MM)
YNNb-YNNt >= 1-YNNAt+trunc(YNNb)-trunc(YNNt) >= 0
-XNNAt+trunc(XNNb)-trunc(XNNt) >= XNNb-XNNt >= 0
-(frac(YNNb)-frac(YNNt)) <= YNNAt-1 <= trunc(YNNb)-trunc(YNNt)
XNNAt <= -(frac(XNNb)-frac(XNNt))
    -1 <= -(frac(XNNb)-frac(XNNt)) <= 1
therefore:   XNNAt <= -1
if trunc(YNNb)==trunc(YNNt)
then frac(YNNt)-frac(YNNb) <= YNNAt-1 <= 0
    0 >= frac(YNNt)-frac(YNNb) >= 1
therefore:   YNNAt = 1 when trunc(YNNb)==trunc(YNNt)
if trunc(YNNb)!=trunc(YNNt)
then frac(YNNt)-frac(YNNb)<=YNNAt-1<=trunc(YNNb)-trunc(YNNt)
    1 >= frac(YNNt)-frac(YNNb) >= -1
therefore:   YNNAt >= 2 when trunc(YNNb)!=trunc(YNNt)
```

Figure 7:
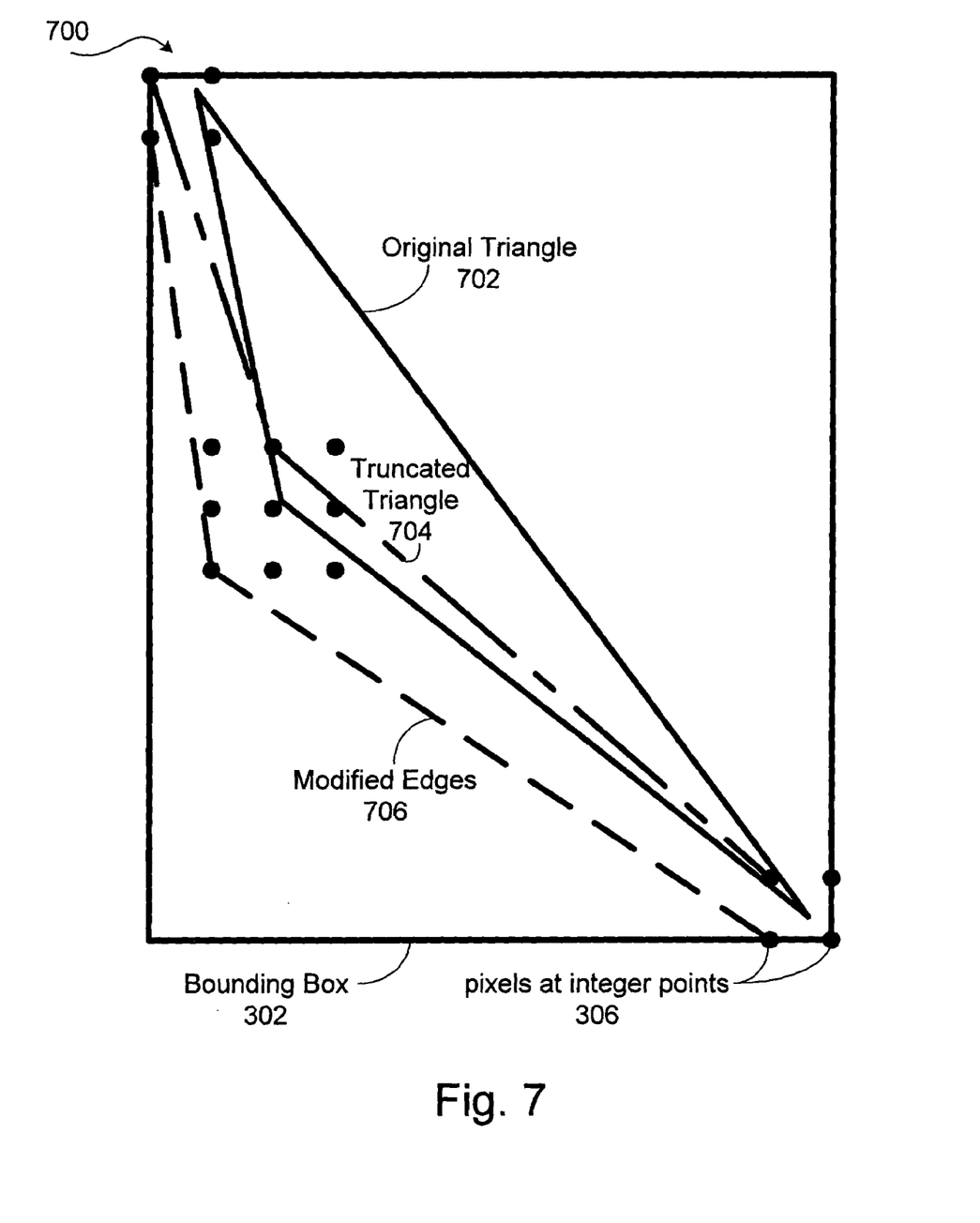
FIG. 7 illustrates a truncation process for bottom left edges.

FIG. 7 illustrates an example of a truncation process 700 for bottom left edges. The two shorter edges of the triangle 702 are both bottom-left edges. The long edge of the original triangle 702 is top-right edge. The truncation and modification of this edge is not shown in FIG. 7.

The following is a description of a truncation process for top right edges. Assume that edge N and edge NN are right edges with positive slopes, edge N touches the top vertex, and edge NN touches the bottom vertex. Both edges are above and to the right of the interior. The following conditions must be maintained to prevent M and MM from intersecting N or NN:

11. XNt<=trunc(XNt)+XNAt
12. YNt>=trunc(YNt)+YNAt
13. XNNb<=trunc(XNNb)+XNNAb
14. YNNb>=trunc(YNNb)+YNNAb
15. slope(MM)>=slope(NN)>slope(N)>=slope(M)>=0

The smallest adjustments that satisfy conditions 11 through 15 are:

```
XNAt = 1, YNAt = 0, XNNAb = 1, YNNAb = 0
slope(N) = (YNb-YNt)/(XNb-XNt)
slope(M) =
    ((trunc(YNb)+YNAb)-(trunc(YNt)+0))/
    ((trunc(XNb)+XNAb)-(trunc(XNt)+1))
if numerator(slope(N)) >= numerator(slope(M)) >= 0
and denominator (slope(M)) >= denominator(slope(N)) >= 0
```

-continued

```
then slope(N) >= slope(M)
YNb-YNt >= YNAb+trunc(YNb)-trunc(YNt) >= 0
XNAb-1+trunc(XNb)-trunc(XNt) >= XNb-XNt >= 0
frac(YNb)-frac(YNt)>=YNAb>=-(trunc(YNb)-trunc(YNt))
XNAb-1>=frac(XNb)-frac(XNt)>=-(trunc(XNb)-trunc(XNt))
    -1 <= frac(XNb)-frac(XNt) <= 1
therefore:  XNAb >= 2
if trunc(YNb)==trunc(YNt)
then frac(YNb)-frac(YNt) >= YNAb >= 0
    0 >= frac(YNb)-frac(YNt) >= 1
therefore:  YNAb = 0 when trunc(YNb)==trunc(YNt)
if trunc(YNb)!=trunc(YNt)
then frac(YNb)-frac(YNt)>=YNAb>=-(trunc(YNb)-trunc(YNt))
    frac(YNb) - frac(YNt) >= YNAb
    1 >= frac(YNb) - frac(YNt) >= -1
therefore:  YNAb <= -1 when trunc(YNb)!=trunc(YNt)
slope(NN) = (YNNb-YNNt)/(XNNb-XNNt)
slope(MM) =
    ((trunc(YNNb)+0)-(trunc(YNNt)+YNNAt))/
    ((trunc(XNNb)+1)-(trunc(XNNt)+XNNAt))
if numerator(slope(MM)) >= numerator(slope(NN)) >= 0
and denominator (slope(NN)) >= denominator(slope(MM)) >= 0
then slope(NN) >= slope(MM)
YNNAt+trunc(YNNb)-trunc(YNNt) >= YNNb-YNNt >= 0
XNNb-XNNt <= 1-XNNAt+trunc(XNNb)-trunc(XNNt) <= 0
YNNAt<=frac(YNNt)-frac(YNNb)
frac(XNNt)-frac(XNNb)<=XNNAt-1<=trunc(XNNb)-trunc(XNNt)
    -1 <= frac(YNNt)-frac(YNNb) <= 1
therefore:  YNNAt <= -1
if trunc(XNNb)==trunc(XNNt)
then frac(XNNt)-frac(XNNb)<=XNNAt-1 <= 0
    0 >= XNNb-XNNt >= 1
therefore:  XNNAt = 1 when trunc(XNNb)==trunc(XNNt)
if trunc(XNNb)!=trunc(XNNt)
then frac(XNNt)-frac(XNNb)<=XNNAt-1<=trunc(XNNb)-trunc(XNNt)
    1 >= frac(XNNt) - frac(XNNb) >= -1
therefore:  XNNAt >= 2 when trunc(XNNb)!=trunc(XNNt)
```

Figure 8:
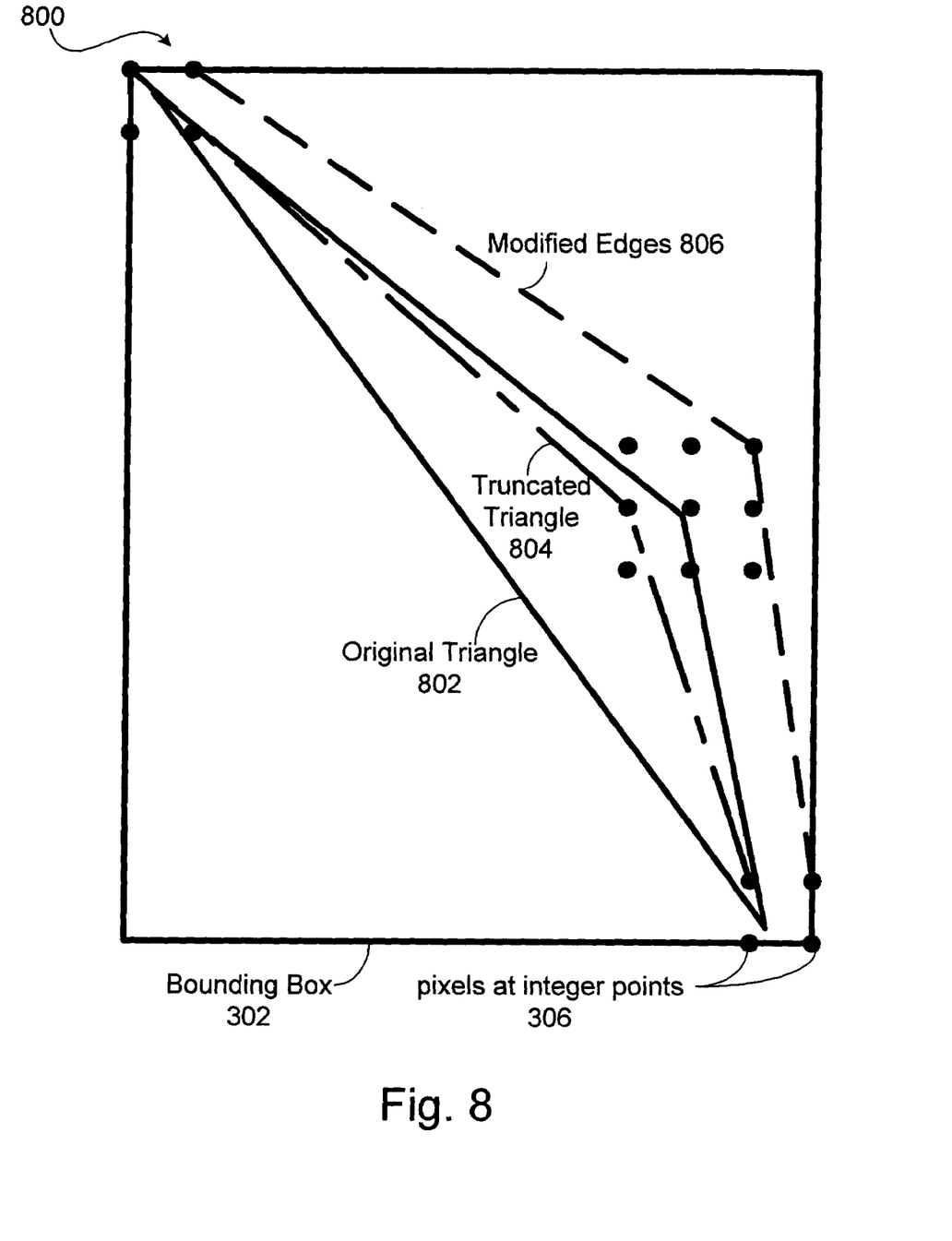
FIG. 8 illustrates a truncation process for top right edges.

FIG. 8 illustrates an example of a truncation process 800 for top right edges. The two shorter edges of the triangle 802 are both top-right edges. The long edge of the original triangle 802 is bottom-left edge. The truncation and modification of this edge is not shown in FIG. 8.

The following is a description of a truncation process for bottom right edges. Assume that edge N and edge NN are right edges with negative slopes, edge N touches the top vertex, and edge NN touches the bottom vertex. Both edges are below and to the right of the interior. The following conditions must be maintained to prevent M and MM from intersecting N or NN:

16. XNt<=trunc(XNt)+XNAt
17. YNt<=trunc(YNt)+YNAt
18. XNNb<=trunc(XNNb)+XNNAb
19. YNNb<=trunc(YNNb)+YNNAb
20. 0>=slope(MM)>=slope(NN)>slope(N)>=slope(M)

The smallest adjustments that satisfy conditions 16 through 20 are:

```
XNAt = 1, YNAt = 1, XNNAb = 1, YNNAb = 1
slope(N) = (YNb-YNt)/(XNb-XNt)
slope(M) =
    ((trunc(YNb)+YNAb)-(trunc(YNt)+1))/
    ((trunc(XNb)+XNAb)-(trunc(XNt)+1))
if numerator(slope(M)) >= numerator(slope(N)) >= 0
and denominator(slope(N)) <= denominator(slope(M)) <= 0
then slope(N) >= slope(M)
YNAb-1+trunc(YNb)-trunc(YNt) >= YNb-YNt >= 0
XNb-XNt <= XNAb-1+trunc(XNb)-trunc(XNt) <= 0
YNAb-1>=frac(YNb)-frac(YNt)
frac(XNb)-frac(XNt) <= XNAb-1 <= -(trunc(XNb)-trunc(XNt))
    -1 <= frac(YNb)-frac(YNt) <= 1
therefore:  YNAb >= 2
if trunc(XNb)==trunc(XNt)
then frac(XNb)-frac(XNt) <= XNAb-1 <= 0
    0 >= frac(XNb)-frac(XNt) >= 1
therefore:  XNAb = 1 when trunc(XNb)==trunc(XNt)
if trunc(XNb)!=trunc(XNt)
then frac(XNb)-frac(XNt)<=XNAb-1<=-(trunc(XNb)-trunc(XNt))
    1 >= frac(XNb) - frac(XNt) >= -1
therefore:  XNAb >= 2 when trunc(XNb)!=trunc(XNt)
slope(NN) = (YNNb-YNNt)/(XNNb-XNNt)
slope(MM) =
    ((trunc(YNNb)+1)-(trunc(YNNt)+YNNAt))/
    ((trunc(XNNb)+1)-(trunc(XNNt)+XNNAt))
if numerator(slope(NN)) >= numerator(slope(MM)) >= 0
and denominator (slope(MM)) <= denominator(slope(NN)) <= 0
then slope(MM) >= slope(NN)
YNNb-YNNt >= 1-YNNAt+trunc(YNNb)-trunc(YNNt) >= 0
1-XNNAt+trunc(XNNb)-trunc(XNNt) <= XNNb-XNNt <= 0
-(frac(YNNb)-frac(YNNt)) <= YNNAt-1 <= trunc(YNNb)-trunc(YNNt)
XNNAt-1 >= -(frac(XNNb)-frac(XNNt))
    -1 <=-(frac(XNNb)-frac(XNNt)) <= 1
therefore:  XNNAt >= 2
if trunc(YNNb)==trunc(YNNt)
then frac(YNNt)-frac(YNNb) <= YNNAt-1 <= 0
    0 >= frac(YNNt)-frac(YNNb) >= 1
therefore:  YNNAt = 1 when trunc(YNNb)==trunc(YNNt)
if trunc(YNNb)!=trunc(YNNt)
then frac(YNNt)-frac(YNNb)<=YNNAt-1<=trunc(YNNb)-trunc(YNNt)
    1 >= frac(YNNt)-frac(YNNb) >= -1
therefore:  YNNAt >= 2 when trunc(YNNb)!=trunc(YNNt)
```

Figure 9:
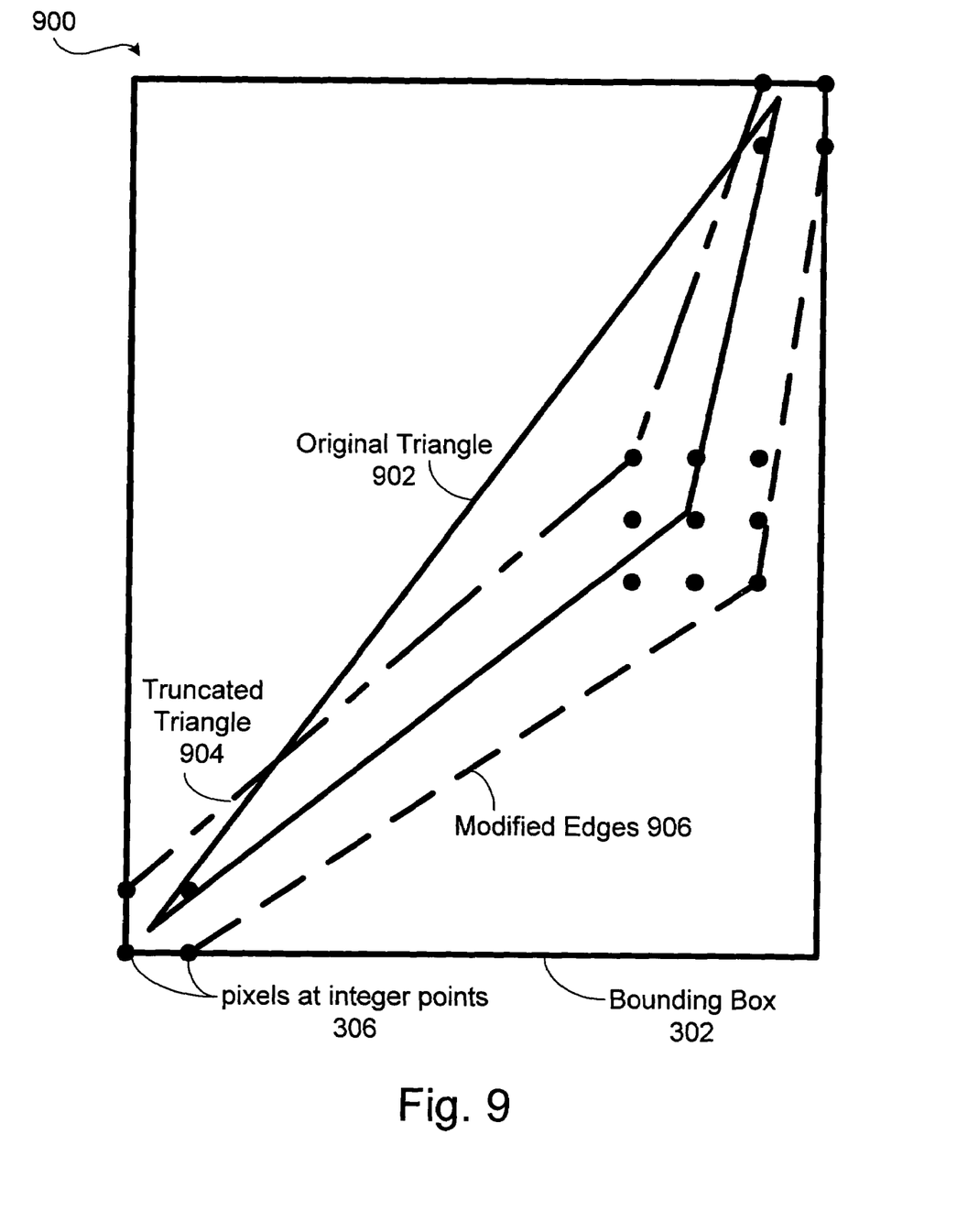
FIG. 9 illustrates a truncation process for bottom right edges.

FIG. 9 illustrates an example of a truncation process 900 for bottom right edges. The two shorter edges of the triangle 902 are both bottom-right edges. The long edge of the original triangle 902 is top-left edge. The truncation and modification of this edge is not shown in FIG. 9.

Figure 10:
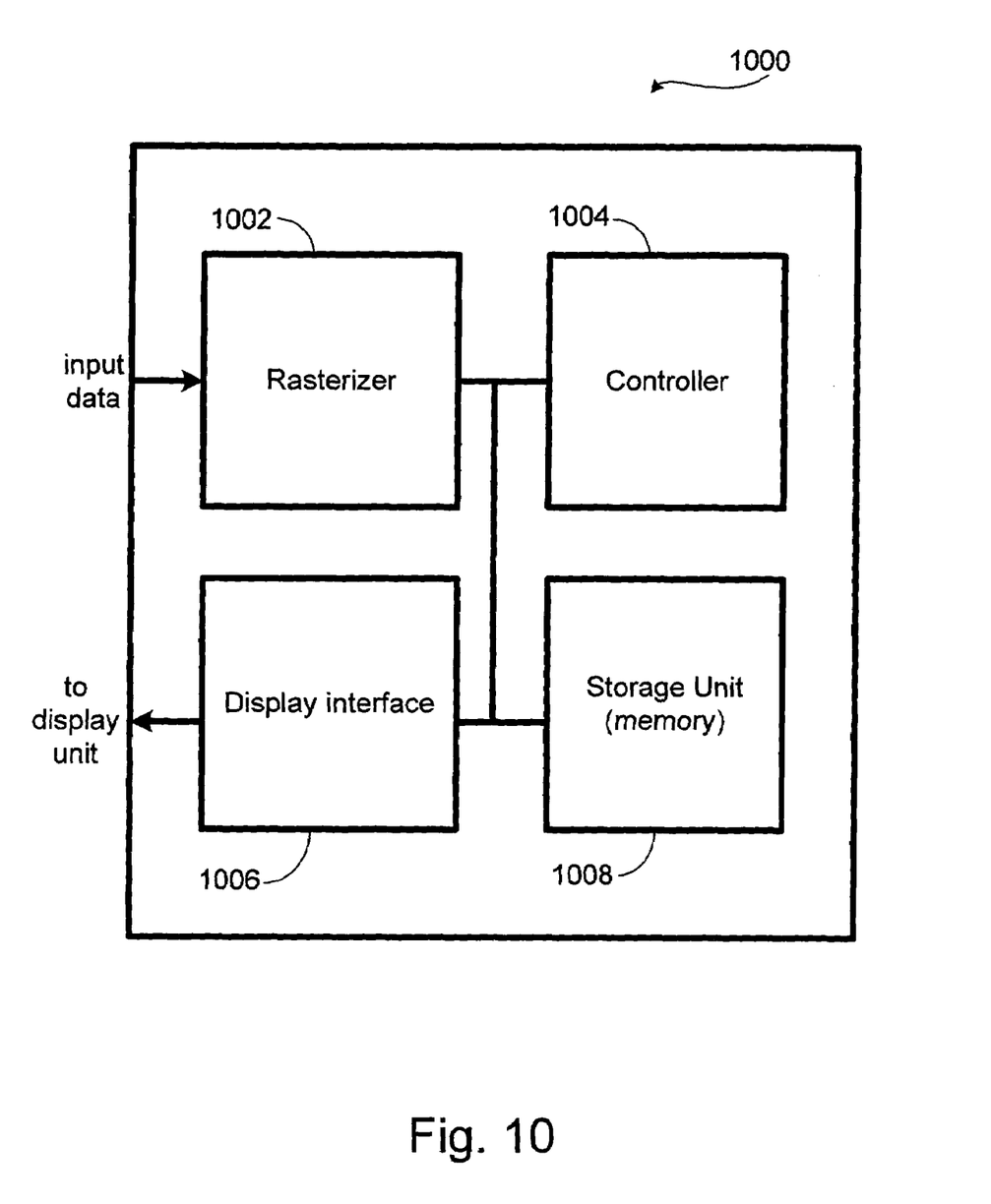
FIG. 10 is a block diagram of a system supporting the rasterization process.

FIG. 10 is a block diagram of a system 1000 supporting rasterization process by approximation. The system 1000 has a rasterizer 1002, a controller 1004, a display interface unit 1006, and a storage unit 1008. The rasterizer 1002 receives data input and performs approximation described above under control of the controller 1002. The rasterizer 1002 interfaces with the storage unit 1008, where Table 1 is stored and the rasterized data is sent to a display unit. The rasterizer 1002 may, instead of retrieving data from the storage unit 1008, calculate coordinates for a modified edge according to the teaching of this invention.

In the context of the invention, the method may be implemented, for example, by operating portion(s) of a computing device to execute a sequence of machine-readable instructions, such as the wireless communications device or the server. The instructions can reside in various types of data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog media.

While the invention has been particularly shown and described with reference to a preferred embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated

The invention claimed is:

1. A method for rasterizating an image on a display that is divided into a plurality of selected regions, wherein the image is decomposed into one or more convex polygons, each convex polygon defined a plurality of original edges, wherein each original edge is defined by a first vertex and a second vertex, the method comprising the steps of:
   truncating coordinates of the first vertex to a preselected precision, the truncated coordinates of the first vertex defining a first truncated vertex;
   truncating coordinates of the second vertex to the preselected precision, the truncated coordinates of the second vertex defining a second truncated vertex;
   generating coordinates for a first modified vertex by adjusting the first truncated vertex according to characteristics of the original edge;
   generating coordinates for a second modified vertex by adjusting the second truncated vertex according to the characteristics of the original edge, wherein the first modified vertex and the second modified vertex defining a modified edge of the polygon for each original edge; and
   if a first selected region intersects a second region defined by the modified edges, then refreshing the first selected region on the display.

2. The method of claim 1, further comprising the steps of:
   receiving the coordinates for the first vertex of an original edge; and
   receiving the coordinates for the second vertex of the original edge.

3. The method of claim 1, wherein the step of truncating coordinates of a first vertex further comprising the step of eliminating a fractional part of the coordinates of the first vertex.

4. The method of claim 1, wherein the step of generating coordinates for a first modified vertex further comprising the steps of:
   if the original edge touches a top vertex of the convex polygon, then assigning a true condition to a first element, otherwise assigning a false condition to the first element;
   if the original edge is on left of the interior of the convex polygon, then assigning a true condition to a second element, otherwise assigning a false condition to the second element;
   if the original edge has a negative slope, then assigning a true condition to a third element, otherwise assigning a false condition to the third element;
   if the first truncated vertex and the second truncated vertex defines an edge parallel to a x-axis, then assigning a true condition to a fourth element, otherwise, assigning a false condition to the fourth element;
   if the first truncated vertex and the second truncated vertex defines an edge parallel to a y-axis, then assigning a true condition to a fifth element, otherwise assigning a false condition to the fifth element;
   deriving a first pair values based on the first element, the second element, the third element, the fourth element, and the fifth element; and
   adding the first pair values to the truncated coordinates of the first vertex.

5. The method of claim 1, wherein the step of generating coordinates for a first modified vertex further comprising the steps of:
   retrieving a first pair values from a table; and
   adding the first pair values to the truncated coordinates of the first vertex.

6. The method of claim 1, wherein the convex polygon is a triangle.

7. The method of claim 1, wherein the convex polygon is a convex quad.

8. A computer readable medium on which is stored a computer program that rasterizes an image on a display that is divided into a plurality of selected regions, wherein the image is decomposed into one or more convex polygons, each convex polygon defined a plurality of original edges, wherein each original edge is defined by a first vertex and a second vertex, the computer program comprising instructions, which when executed by a computing device performs the steps of:
   truncating coordinates of the first vertex to a preselected precision, the truncated coordinates of the first vertex defining a first truncated vertex;
   truncating coordinates of the second vertex to the preselected precision, the truncated coordinates of the second vertex defining a second truncated vertex;
   generating coordinates for a first modified vertex by adjusting the first truncated vertex according to characteristics of the original edge;
   generating coordinates for a second modified vertex by adjusting the second truncated vertex according to the characteristics of the original edge, wherein the first modified vertex and the second modified vertex defining a modified edge of the polygon for each original edge; and
   if a first selected region intersects a second region defined by the modified edges, then refreshing the first selected region on the display.

9. The computer readable medium of claim 8, further comprising the steps of:
   receiving the coordinates for the first vertex of an original edge; and receiving the coordinates for the second vertex of the original edge.

10. The computer readable medium of claim 8, wherein the step of truncating coordinates of a first vertex further comprising the step of eliminating a fractional part of the coordinates of the first vertex.

11. The computer readable medium of claim 8, wherein the step of generating coordinates for a first modified vertex further comprising the steps of:
   if the original edge touches a top vertex of the convex polygon, then assigning a true condition to a first element, otherwise assigning a false condition to the first element;
   if the original edge is on left of the interior of the convex polygon, then assigning a true condition to a second element, otherwise assigning a false condition to the second element;
   if the original edge has a negative slope, then assigning a true condition to a third element, otherwise assigning a false condition to the third element;
   if the first truncated vertex and the second truncated vertex defines an edge parallel to an x-axis, then assigning a true condition to a fourth element, otherwise assigning a false condition to the fourth element;
   if the first truncated vertex and the second truncated vertex defines an edge parallel to a y-axis, then assigning a true condition to a fifth element, otherwise assigning a false condition to the fifth element;

deriving a first pair values based on the first element, the second element, the third element, the fourth element, and the fifth element; and adding the first pair values to the truncated coordinates of the first vertex.

12. The computer readable medium of claim 8, wherein the step of generating coordinates for a first modified vertex further comprising the steps of: retrieving a first pair values from a table; and adding the first pair values to the truncated coordinates of the first vertex.

13. The computer readable medium of claim 8, wherein the convex polygon is a triangle.

14. The computer readable medium of claim 8, wherein the convex polygon is a convex quad.

15. A system for rasterizing on a display a convex polygon with a plurality of original edges, wherein each original edge is defined by two vertices and each original edge derives a modified edge of the polygon, the modified edge is used to determine whether a selected region of the display intersects the corresponding edge, the system comprising:

a controller;

a rasterizer connected to the controller;

a display interface unit connected to the rasterizer, the display interface unit receiving rasterized data from the rasterizer and transmitting the rasterized data to a display unit; and a storage unit for storing data used during the rasterization process, wherein the rasterizer being capable of rasterizing an image on the display device divided into a plurality of preselected regions, wherein the image is decomposed into one or more convex polygons, each convex polygon defined a plurality of original edges, wherein each original edge is defined by a first vertex and a second vertex, by executing the steps of:

truncating coordinates of the first vertex to a preselected precision, the truncated coordinates of the first vertex defining a first truncated vertex;

truncating coordinates of the second vertex to the preselected precision, the truncated coordinates of the second vertex defining a second truncated vertex;

generating coordinates for a first modified vertex by adjusting the first truncated vertex according to characteristics of the original edge;

generating coordinates for a second modified vertex by adjusting the second truncated vertex according to the characteristics of the original edge, wherein the first modified vertex and the second modified vertex defining a modified edge for each original edge; and if a first selected region intersects a second region defined by the modified edges, then refreshing the first selected region on the display.

16. The system of claim 15, wherein the rasterizer further executes the steps of:

receiving the coordinates for the first vertex of an original edge; and receiving the coordinates for the second vertex of the original edge.

17. The system of claim 15, wherein the step of truncating coordinates of a first vertex further comprising the step of eliminating a fractional part of the coordinates of the first vertex.

18. The system of claim 15, wherein the step of generating coordinates for a first modified vertex further comprising the steps of:

if the original edge touches a top vertex of the convex polygon, then assigning a true condition to a first element, otherwise assigning a false condition to the first element;

if the original edge is on left of the interior of the convex polygon, then assigning a true condition to a second element, otherwise assigning a false condition to the second element;

if the original edge has a negative slope, then assigning a true condition to a third element, otherwise assigning a false condition to the third element;

if the first truncated vertex and the second truncated vertex defines an edge parallel to an x-axis, then assigning a true condition to a fourth element, otherwise assigning a false condition to the fourth element;

if the first truncated vertex and the second truncated vertex defines an edge parallel to a y-axis, then assigning a true condition to a fifth element, otherwise assigning a false condition to the fifth element;

deriving a first pair values based on the first element, the second element, the third element, the fourth element, and the fifth element; and adding the first pair values to the truncated coordinates of the first vertex.

19. The system of claim 15, wherein the step of generating coordinates for a first modified vertex further comprising the steps of:

retrieving a first pair values from a table; and adding the first pair values to the truncated coordinates of the first vertex.

20. The computer readable medium of claim 15, wherein the convex polygon is a triangle.

21. The computer readable medium of claim 15, wherein the convex polygon is a convex quad.

* * * * *